United States Patent
Igarashi

(10) Patent No.: US 8,930,516 B2
(45) Date of Patent: Jan. 6, 2015

(54) MANAGEMENT APPARATUS, MANAGEMENT METHOD, MANAGEMENT SYSTEM, AND NETWORK DEVICE FOR SETTING VALUES OF APPLICATION PROGRAMS

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 13/362,756

(22) Filed: Jan. 31, 2012

(65) Prior Publication Data

US 2012/0209974 A1 Aug. 16, 2012

(30) Foreign Application Priority Data

Feb. 15, 2011 (JP) ................................. 2011-030221
Jun. 3, 2011 (JP) ................................. 2011-125713

(51) Int. Cl.
*G06F 15/173* (2006.01)
*H04L 12/24* (2006.01)

(52) U.S. Cl.
CPC .......... *H04L 41/0816* (2013.01); *H04L 41/022* (2013.01); *H04L 41/046* (2013.01); *H04L 41/12* (2013.01)
USPC .......................................... 709/223; 709/224

(58) Field of Classification Search
CPC ...... H04L 41/022; H04L 41/046; H04L 41/12
USPC ....................................................... 709/223
See application file for complete search history.

(56) References Cited

U.S. PATENT DOCUMENTS

| 7,743,042 | B2 * | 6/2010 | Kim ............................... 707/705 |
| 2005/0068560 | A1 | 3/2005 | Ferlitsch |
| 2009/0059273 | A1 | 3/2009 | Tomita |
| 2010/0106811 | A1 * | 4/2010 | Leib et al. ..................... 709/220 |
| 2011/0099255 | A1 * | 4/2011 | Srinivasan et al. ............ 709/221 |
| 2014/0208089 | A1 * | 7/2014 | Satam et al. ..................... 713/2 |

FOREIGN PATENT DOCUMENTS

| CN | 1859200 A | 11/2006 |
| CN | 101783735 A | 7/2010 |
| CN | 101902351 A | 12/2010 |
| JP | 2006-252537 A | 9/2006 |
| JP | 2010-198598 A | 9/2010 |
| WO | 95/08794 A | 3/1995 |

OTHER PUBLICATIONS

European Search Report for European Application No. 12153430.9 dated May 14, 2012.
Chinese Office Action issued in corresponding application No. 201210041930.2 on May 6, 2014.

* cited by examiner

*Primary Examiner* — Mohamed Wasel
(74) *Attorney, Agent, or Firm* — Carter, DeLuca, Farrell & Schmidt, LLP

(57) ABSTRACT

When an application installed in a network device, which allows for the manipulation of setting values of an application from a remote place, is not configured for that device, a management apparatus manipulates setting values using an agent. The management apparatus manipulates the setting values after the application is quitted or manipulates the setting values while the application is running, if the setting values can be manipulated while the application is running.

10 Claims, 14 Drawing Sheets

FIG. 6

```
<? xml version="1.0" encoding="UTF-8"?>
<Setting>
    <AppInfo AppID="abcde 585-f319-4f24-b 511-bbd9c8f690cc"/>

<Data Entry>
        <Data Name="Font">
            <Property>
                <Type> String</Type>
                <Value> Century</Value>
            </Property>
        </Data>

<Data Name="Font_Color">
            <Property>
                <Type> String</Type>
                <Value> White</Value>
            </Property>
        </Data>

<Data Name="Font_Size">
            <Property>
                <Type> String</Type>
                <Value>20</Value>
            </Property>
        </Data>
    </Data Entry>
</Setting>
```

600, 601, 602, 603, 604

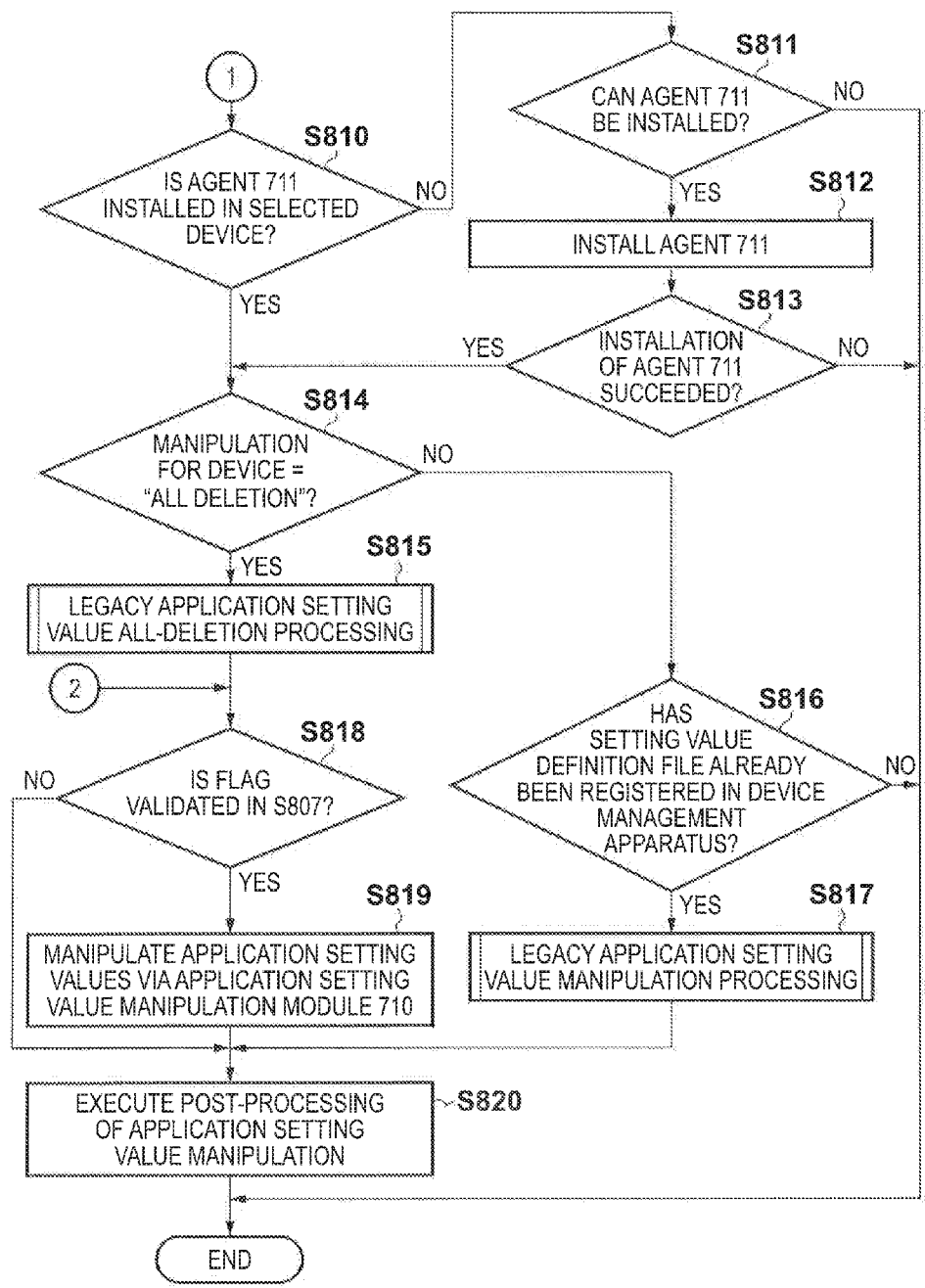

FIG. 9

APPLICATION LIST 900

| APPLICATION NAME 901 | APPLICATION ID 902 | VERSION 903 | SETTING VALUE MANIPULATION 904 | PATH INFORMATION 905 | SETTING VALUE DEFINITION FILE 906 | APPLICATION TYPE 907 |
|---|---|---|---|---|---|---|
| App1 | abcde 585-f319-4f24-b 511-bbd9c8f690cc | 2.00 | COMPATIBLE | storage | | GENERAL |
| App2 | aaabb 585-f319-4f24-b 511-bbd9c8f690cc | 1.00 | PARTIALLY COMPATIBLE | storage | Setting.def | AUTHENTICATION |
| App3 | eeeff 585-f319-4f24-b 511-bbd9c8f690cc | 1.00 | INCOMPATIBLE | ftp://aaa.com/ | | GENERAL |

FIG. 10

```
<? xml version="1.0" encoding="UTF-8"?>
<Setting>                                                    1001

<AppInfo AppID="aaabb 585-f319-4f24-b 511-bbd9c8f690cc"/>

<Data Entry>
        <Data Name="Font"></Data>                    1002

<Data Name="Font_Color"></Data>              1003

<Data Name="Font_Size"></Data>               1004

</Data Entry>
</Setting>
```

| MFP LIST 1100 |||||
|---|---|---|---|---|
| SERIAL NUMBER 1101 | IP ADDRESS 1102 | PRODUCT NAME 1103 | SETTING VALUE MANIPULATION 1104 | INSTALLED APPLICATION 1105 |
| ABC123 | 10.1.1.10 | MFP 102 | POSSIBLE | App1 App2 |
| DEF456 | 10.1.1.20 | MFP 103 | IMPOSSIBLE | App1 App3 |

FIG. 12

| APPLICATION SELECTION | | | | | | | |
|---|---|---|---|---|---|---|---|
| 1201 | 1202 | 1203 | 1204 | | 1205 | 1206 | 1207 |
| APPLICATION NAME | APPLICATION ID | VERSION | SETTING VALUE MANIPULATION | | PATH INFORMATION | SETTING VALUE DEFINITION FILE | APPLICATION TYPE |
| ☒ App1 | abcde585-f319-4f24-b511-bbd9c8f690cc | 2.00 | COMPATIBLE | | storage | - | GENERAL |
| ☒ App2 | aaabb585-f319-4f24-b511-bbd9c8f690cc | 1.00 | PARTIALLY COMPATIBLE | | storage | Setting.def | AUTHENTICATION |
| ☐ App3 | eeeff585-f319-4f24-b511-bbd9c8f690cc | 1.00 | INCOMPATIBLE | | ftp://aaa.com/ | NONE | GENERAL |

MANIPULATION METHOD ~1208

● ACQUISITION   ○ DELIVERY   ○ DELETION   ○ ALL DELETION

| SERIAL NUMBER | IP ADDRESS | PRODUCT NAME | SETTING VALUE MANIPULATION | INSTALLED APPLICATION | AUTHENTICATION INFORMATION |
|---|---|---|---|---|---|
| ☒ ABC123 | 10.1.1.10 | MFP 102 | POSSIBLE | App1 App2 | *** |
| ☒ DEF456 | 10.1.1.20 | MFP 103 | IMPOSSIBLE | App1 App3 | **** |

1301　1302　1303　1304　1305　1306

MFP SELECTION

1300

OK

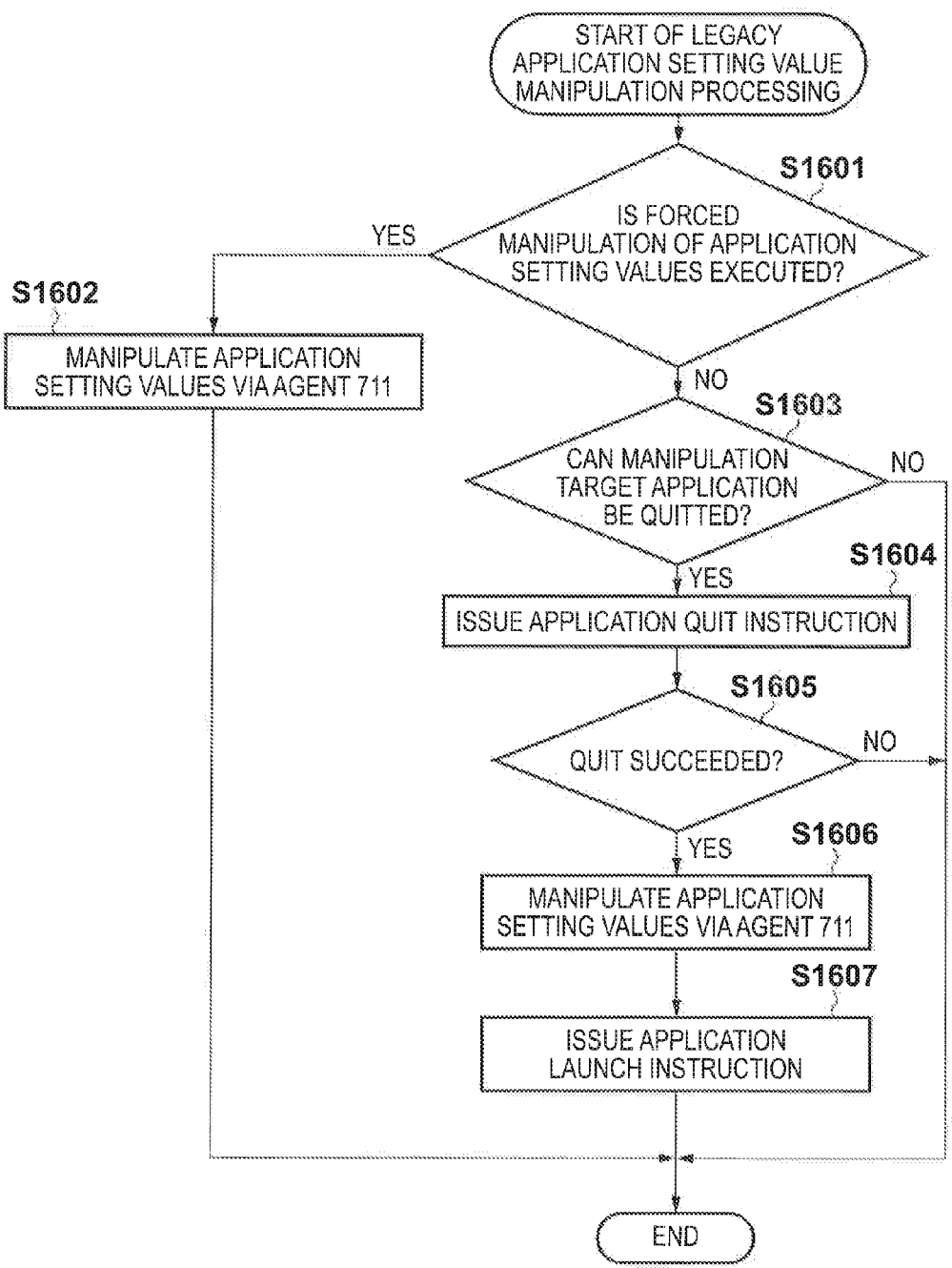
F I G. 16

MANAGEMENT APPARATUS, MANAGEMENT METHOD, MANAGEMENT SYSTEM, AND NETWORK DEVICE FOR SETTING VALUES OF APPLICATION PROGRAMS

BACKGROUND OF THE INVENTION

1. Field of the Invention

The present invention relates to a management apparatus and management method required to manipulate (for example, to acquire, deliver, delete, and so forth), from a remote place, various setting values of an application program or data (to be generally referred to as an application hereinafter) installed in at least one network device connected to a network, a management system, and a network device.

2. Description of the Related Art

In recent years, a management apparatus at a remote place can manipulate setting values of an application installed in a network device using communication protocols of a Web service and the like.

For example, in Japanese Patent Laid-open No. 2010-198598, an information delivery apparatus sends application setting information, which describes setting values of an application installed in a network device, to the network device. Upon reception of the application setting information from the information delivery apparatus, an application setting/receiving module of the network device requests the application, which is running on the network device, to reflect the setting information. The application reflects the application setting information received from the application setting/receiving module to itself.

As another example, Japanese Patent Laid-open No. 2006-252537 provides a Web service interface providing method. In this method, a proxy module called a service surrogate is set between a client and application, and the client and application communicate with each other via the service surrogate. The service surrogate initializes itself using separately prepared metadata so as to communicate with the application. By initializing the service surrogate using different metadata for respective applications, the client can manipulate setting values of various applications.

However, in Japanese Patent Laid-Open No. 2010-198598, in order to allow the information delivery apparatus to manipulate setting values of the application, the application has to be configured to receive the application setting information from the application setting/receiving module.

Also, with the method described in Japanese Patent Laid-Open No. 2006-252537, the application itself is required to have a communication interface with the service surrogate for the purpose of setting value manipulation.

However, on the market, there are many applications, which are not configured to receive the application setting information from the application setting/receiving module, and do not have any communication function for setting value manipulation.

SUMMARY OF THE INVENTION

The present invention has been made to solve the aforementioned problems, and provides a management apparatus and management method, which can manipulate setting values of an application from a remote place, a management system, and a network device.

The present invention comprises the following arrangement.

According to one aspect of the present invention, a management apparatus for a network device, comprises: a storage unit, configured to store, in a storage, a device list which registers a model of a network device and information indicating whether or not the model is compatible with standard setting information defined in a predetermined format in association with each other; and a request unit, configured to transmit, when it is determined with reference to the device list that a target network device is not a model compatible with the standard setting information, a request to execute a manipulation of setting information of an application as a manipulation target via an agent required to manipulate the setting information of the target application which runs on the target network device.

According to another aspect of the present invention, a network device on which an application runs, comprises: a reception unit, configured to receive a request to execute a manipulation of setting information of an application from a management apparatus which manages a network device; and a control unit, configured to execute an agent required, to manipulate setting information which is used by the application and is not defined in a predetermined format, wherein as a function of the agent, the agent manipulates the setting information which is not defined in the predetermined format in response to a request.

According to still another aspect of the present invention, a management system in which a management apparatus manages a network device on which an application runs, the management apparatus comprises: a storage unit, configured to store, in a storage, a device list which registers a model of a network device and information indicating whether or not the model is compatible with standard setting information defined in a predetermined format in association with each other; and a transmission unit, configured to transmit, when it is determined with reference to the device list that a target network device is not a model compatible with the standard setting information, a request to execute a manipulation of setting information of an application as a manipulation target via an agent required to manipulate the setting information of the target application which runs on the target network device, and the network device comprises; a control unit, configured to execute the agent; and a reception unit, configured to receive a request to execute a manipulation of setting information of an application which runs on the network device from the management apparatus, wherein as a function of the agent, the agent manipulates the setting information in response to the request.

According to the present invention, setting values of an application can be remotely manipulated by a method optimal to each type of application installed in a network device.

Also, using a setting value definition file upon manipulating application setting values, a network device administrator can selectively manipulate only required, application setting values.

Further features of the present invention will become apparent from the following description of exemplary embodiments (with reference to the attached drawings).

BRIEF DESCRIPTION OF THE DRAWINGS

FIG. 6 is a view showing the configuration of application setting information;

FIGS. 8A and 8B are flowcharts of the management apparatus according to the first embodiment;

FIG. 9 is a table showing an example of an application list;

FIG. 10 is a view showing an example of the configuration of a setting value definition file;

FIG. 11 is a table showing an example of a device list;

FIG. 12 is a view showing an example of an application selection screen;

FIG. 13 is a view showing an example of an MFP selection screen;

FIG. 16 is a flowchart of legacy application setting value manipulation processing according to the first embodiment.

DESCRIPTION OF THE EMBODIMENTS

A best mode of carrying out the present invention will be described hereinafter with reference to the drawings. This embodiment will explain operations executed when a management apparatus of network devices manipulates setting values of an application installed in at least one network device. According to the present invention, manipulations of setting values include at least one of processes for delivering setting values from the management apparatus to the network device, for setting values in the network device, for deleting setting values from the network device, and for acquiring setting values from the network device by the management apparatus. Note that "setting" includes changing of all or some setting values. Also, "deletion" includes that of all or some setting values.

Figure 1:
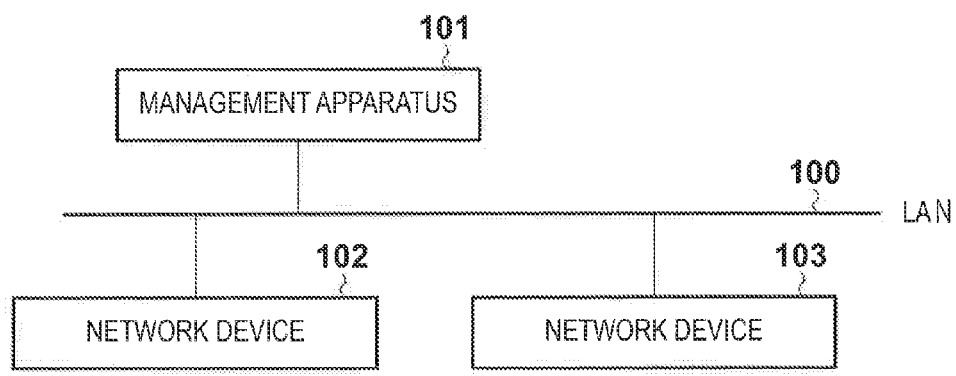
FIG. 1 is a diagram showing the configuration of a system according to the first embodiment.

FIG. 1 shows the configuration of a management system in which the management apparatus operates. Referring to FIG. 1, reference numeral 101 denotes a management apparatus of this embodiment. Reference numerals 102 and 103 denote network devices represented by MFPs. All these devices are connected to a network via a LAN 100.

<Hardware Arrangement of Management Apparatus>

Figure 2:
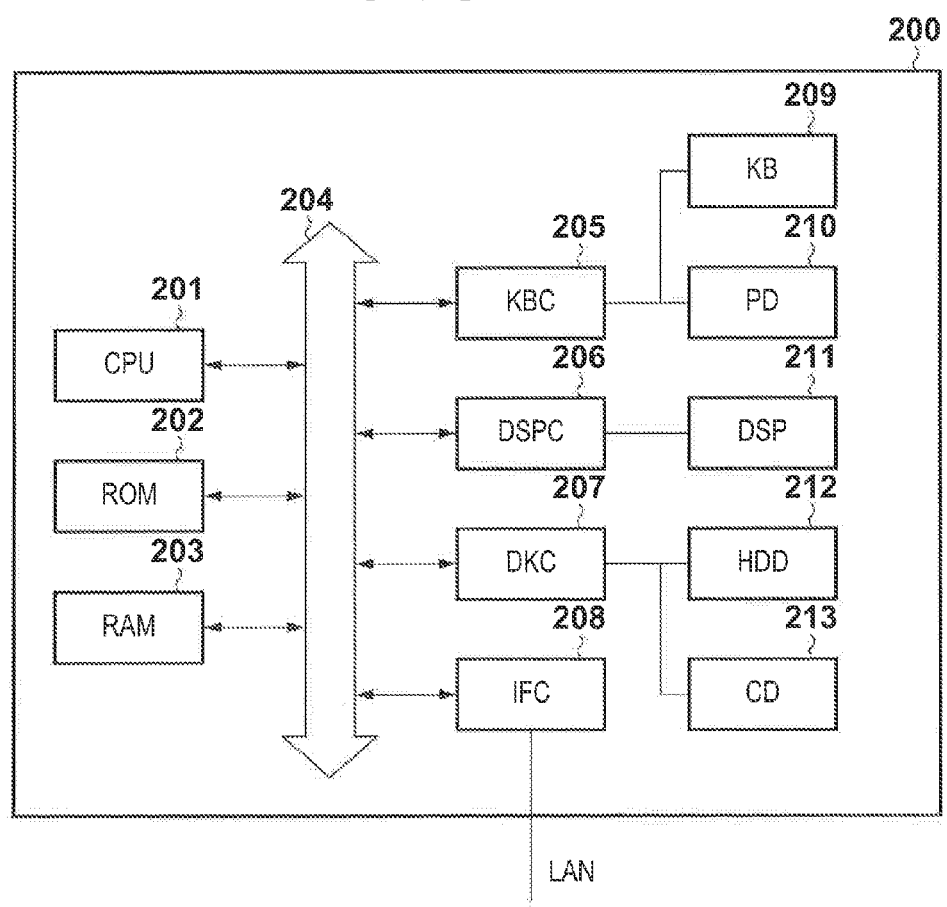
FIG. 2 is a block diagram showing the internal arrangement of a management apparatus.

FIG. 2 is a block diagram for explaining the internal arrangement of the management apparatus 101. The management apparatus 101 of this embodiment has the same arrangement as that of a general-purpose computer since it is implemented on a personal computer (PC). A hard disk (HDD) 212 stores a program of network device management software according to this embodiment as an operation main body in all the following descriptions.

In FIG. 2, a management apparatus 200 is the same as the management apparatus 101. A CPU 201 is an execution main body on hardware unless otherwise specified in all the following descriptions, and executes the program of the network device management software and the like. On the other hand, a control main body on software is the network device management software stored in the hard disk (HDD) 212.

A ROM 202 stores a BIOS and boot program. A RAM 203 serves as a main memory, work area, and the like of the CPU 201. A keyboard controller (KBC) 205 controls instruction inputs from a keyboard (KB) 209, a pointing device (PD) 210, and the like. A display controller (DSPC) 206 controls display of a display (DSP) 211. A disk controller (DKC) 207 controls accesses to secondary storage devices such as the hard disk (HDD) 212 and a CD-ROM (CD) 213. The hard disk (HDD) 212 and CD-ROM (CD) 213 store a boot program, operating system, database, network device management application, and their data. An interface controller (IFC) 208 exchanges information with other network devices via a LAN (Local Area Network). These components are disposed on a system bus 204. In this embodiment, for example, Windows® (Microsoft Corporation) is assumed as an OS. However, the present invention is not limited to this.

Note that the network device management program according to this embodiment may be supplied in a form while being stored in a storage medium such as a CD-ROM. In this case, the CD-ROM (CD) 213 shown in FIG. 2 reads out the program from the storage medium, and the readout program is installed in the hard disk (HDD) 212.

<Hardware Arrangement Example of Network Device>

Figure 3:
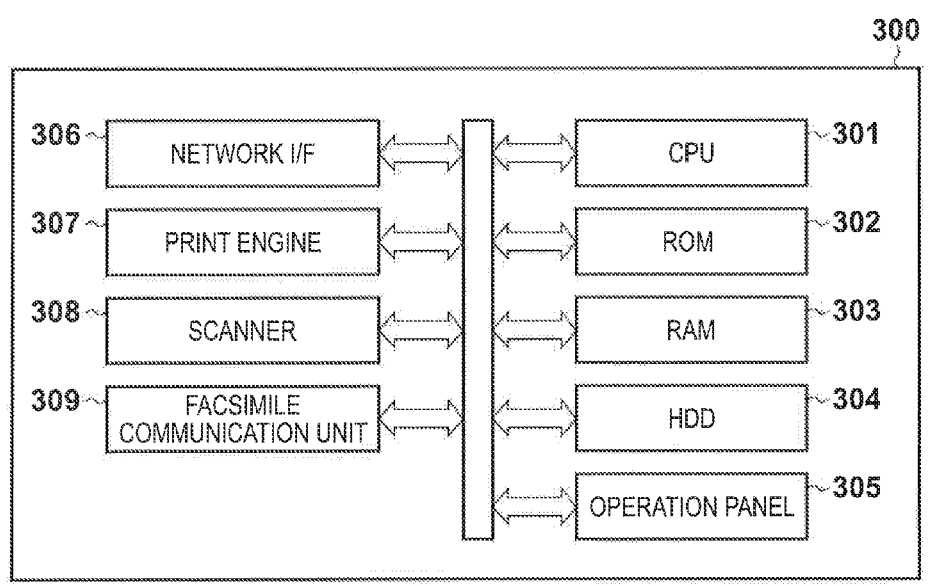
FIG. 3 is a block diagram showing the internal arrangement of a multi-function peripheral (MFP)

FIG. 3 is a block diagram for explaining the internal arrangement of an MFP, which includes a print function, scan function, network communication function, and the like, as an example of the network devices 102 and 103. In FIG. 3, an MFP 300 can be used as the network devices 102 and 103. A CPU 301 controls the overall MFP, and also executes applications installed in the MFP 300. A ROM 302 stores a print processing program to be executed by the CPU 301, and font data. A RAM 303 is used as a work area of the CPU 301, reception buffer, and image rendering area. Setting values of the aforementioned applications are saved in the ROM 302 or RAM 303. When the setting values are saved in the ROM 302, a programmable ROM, which is erasable and writable, is used. A hard disk (HDD) 304 records programs of the applications. An operation panel 305 is configured by various switches and buttons, and a liquid crystal display used to display messages. On the operation panel 305, the user can manipulate setting values of the application. A network interface 306 is used to connect a network. A print engine 307 prints an image on a print sheet. A scanner 308 scans a document. A communication unit 309 transmits/receives facsimile data.

Note that when a device of interest is a device which can be connected to a network, an application to be executed on the network device of interest is installed, and that application has parameters (that is, setting values), which can be changed, the device of interest can be adopted as a network device according to this embodiment. This embodiment will describe the MFP 300 as an example of the network device.

<Software Configuration of Management Apparatus>

Figure 4:
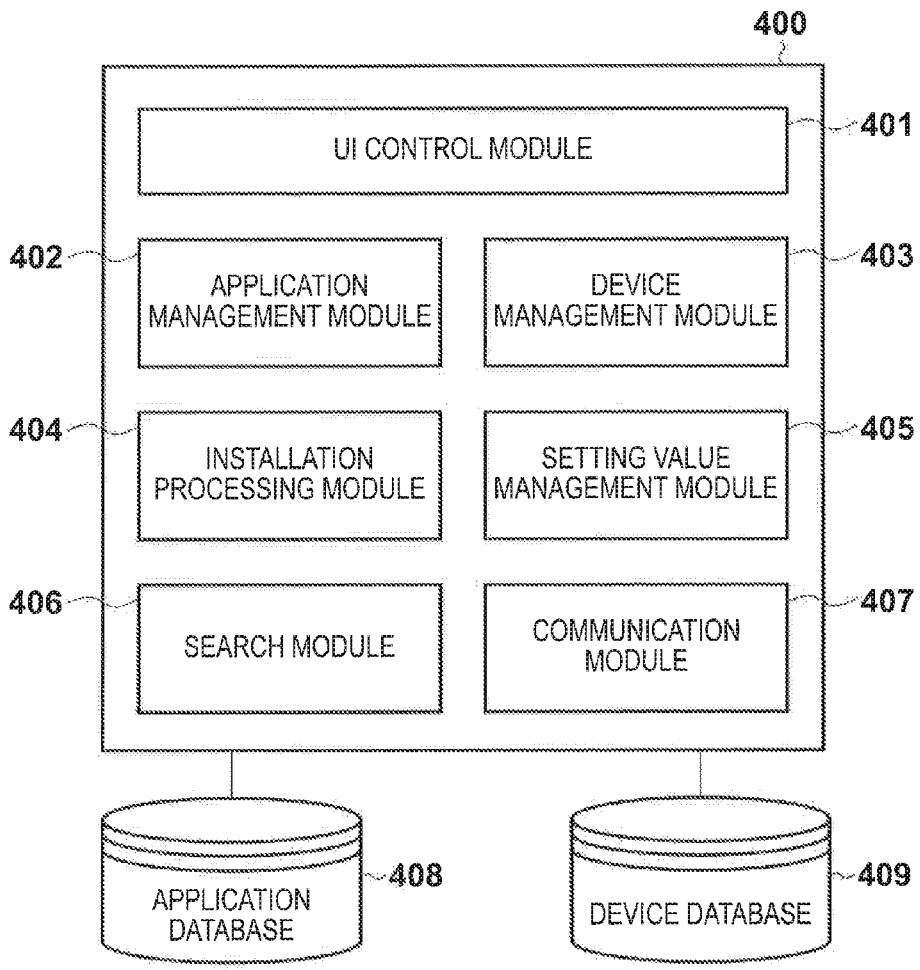
FIG. 4 is a diagram showing the software configuration of the management apparatus.

Software functions of respective components on the management apparatus 101 will be described below with reference to the drawings. FIG. 4 is a diagram for explaining the configuration of software which runs on the management apparatus 101. In FIG. 4, network device management software 400 is software required to manage network devices.

A UI control module 401 provides a graphical user interface which allows an administrator of the MFP to manipulate this software. The graphical user interface is configured to be displayed on the display 211 equipped on the management apparatus 101. Alternatively, the graphical user interface can also be configured as a Web application, which is accessible from other client PCs, using HTTP (HyperText Transfer Protocol).

An application management module 402 manages information of an application file registered by the user. The application file is configured by one file by compressing a plurality of files like a CAB file, JAR (Java® ARchive) file, or ZIP file. The application management module 402 receives the application file from the UI control module 401, and extracts a manifest file after it decompresses the received file. Furthermore, the application management module 402 analyses the manifest file to extract application attached information such as an application name, application ID, and version. After that, the application management module 402 stores the extracted information in an application database 408 together with the application file.

The manifest file is an attached information file, which describes an explanation about a JAR file as a standard compression format file in Java®. Appended information for the JAR file will often be referred to as metadata. In the manifest file, the contents of a designated text file can be additionally written in addition to a version and JAR file creation tool. Note that the manifest file is an example of a file which records appended information, and similar files which record metadata can also be created for a CAB file and ZIP file. In this embodiment, a file which stores appended information for an application as well as those files will be referred to as a manifest file.

A device management module 403 searches for MFPs connected to the network via a search module 406. A search for MFPs can be conducted by sending a search request packet of SLP (Service Location Protocol), SNMP (Simple Network Management Protocol), or the like. As for an MFP discovered by the search, detailed information (a model name, serial number, performance, status, installed applications, etc.) of that MFP can be further acquired via a communication module 407. Location information (IP address) of the MFP and information acquired from the MFP are stored, in a device list on a device database 409. Information registered in the database can be browsed by the user via the UI control module 401. Since the MFP is an example of the network device, information acquired from a network device other than the MFP is stored in the device list, and will often be called a device list more universally.

An installation processing module 404 receives an installation instruction from the UI control module 401, establishes a connection to the MFP via the communication module 407, and executes processing for installing an application in the MFP. Furthermore, the installation processing module 404 also executes processing for launching or quitting the installed application. The processing for installing the application in the MFP is, for example, that for sending the corresponding application program and its installer program to the MFP 300, and controlling the MFP 300 to execute the installer program.

A setting value management module 405 manipulates setting values of an application installed in the MFP via the communication module 407. Also, the setting value management module 405 can manipulate setting information including a plurality of setting values altogether. This embodiment assumes implementation of manipulations of application setting values using a Web service that uses HTTP and SOAP, but such manipulations may be implemented by other communication protocols.

Information of application setting values acquired from the MFP by the setting value management module 405 is stored in the application database 408. Information registered in the database can be browsed by the user via the UI control module 401.

Upon delivering information of application setting values to the MFP, information of setting values, which are selected by the user from those stored in the application database 408 via the UI control module 401, is delivered.

In the application database 408, an application list indicating applications installed in the MFP as the network device is registered. In the device database 409, the device list as a list of MFPs discovered by the management apparatus is registered. The application list and device list will be described later with reference to FIGS. 9, 10, and 11 after a description of the arrangement of the MFP.

<Application File>

Figure 5:
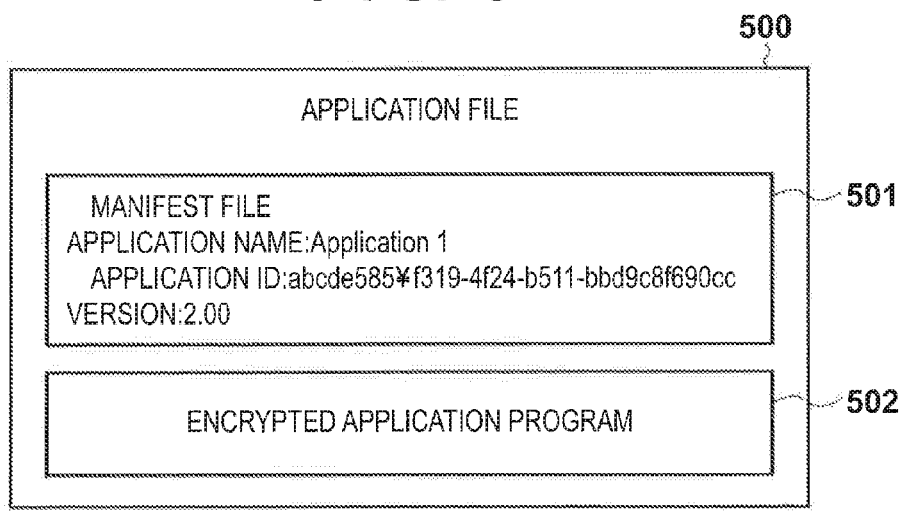
FIG. 5 is a view showing the configuration of an application file.

FIG. 5 is a view for explaining an application file. The application file includes a file (which may be a compressed file) of an application program and its metadata file. In FIG. 5, reference numeral 500 denotes an application file itself, which is configured by one file by compressing a plurality of files like a CAB file, JAR (Java® ARchive) file, or ZIP file.

The application file 500 stores a manifest file 501. The manifest file 501 describes application appended information such as an application name, an application ID used to uniquely identify this application, and a version. An application program 502 in the application file 500 is encrypted to prevent falsification of the program by a third party. The application file is delivered to users via recording media such as CDs or media such as the Internet, and is decrypted and executed at each delivery destination.

<Application Setting Information>

FIG. 6 is a view for explaining the configuration of application setting information of an application compatible with remote settings. A format exemplified in FIG. 6 will be referred to as a standard format, and an application compatible with the application setting information of the standard format will be referred to as a standard application. Also, the setting information of the standard format will be referred to as standard setting information.

In FIG. 6, application setting information 600 is described in an XML (Extensible Markup Language) format.

In this embodiment, since the communication protocols are HTTP and SOAP, the application setting information 600 is described using the XML format, but it may be described using other formats. Respective items in the example of the application setting information shown in FIG. 6 will be described below.

A field 601 bounded by an <AppInfo> tag is an application information description field. An AppID attribute in the <AppInfo> tag describes a value of an application ID of an application associated with the application setting information 600. In this case, as the AppID attribute in the <AppInfo> tag of the application information description field 601, a value "abcde585-f319-4f24-b511-bbd9c8f690cc" is described.

Items 602 to 604 bounded by <Data> tags are respectively application setting values. A Name attribute of the <Data> tag describes a name of an application setting value. In this case, as the Name attributes of the <Data> tags of the application setting values 602, 603, and 604, "Font", "Font_color", and "Font_Size" are respectively described. Also, a <Type> tag describes type information of a value of a <Value> tag, and the <Value> tag describes an application setting value of the corresponding setting item. In the example of FIG. 6, types of all the items are "String", that is, a character string type, and values are "Century", "White", and "20" in turn.

Since the application setting information shown in FIG. 6 includes the application ID and is described using XML, boundaries of respective items and the whole setting information can be specified by interpreting tags. Therefore, as long as tags defined in the standard format can foe interpreted, setting values can be manipulated by a compatible application and application setting value manipulation module (to be described later with reference to FIG. 7).

By contrast, a conventional application, which is incompatible with remote settings, does not have any items, meanings of which are given by tags, as shown in FIG. 6, and has a format unique to each application. This embodiment has a format including an application ID, character strings indicating item names of setting items, and setting values described after these character strings. However, items, item names, an order of items, and the like to be included are unique to an application, and it is difficult to uniformly handle them. Hence, a setting value definition file (see FIGS. 9 and 10) which defines items, item names, and the like for each application is prepared for a non-standard application (to be referred to as a legacy application hereinafter), and is registered in the application database as a part of the application list (FIG. 9).

<Software Configuration of MFP>

Figure 7:
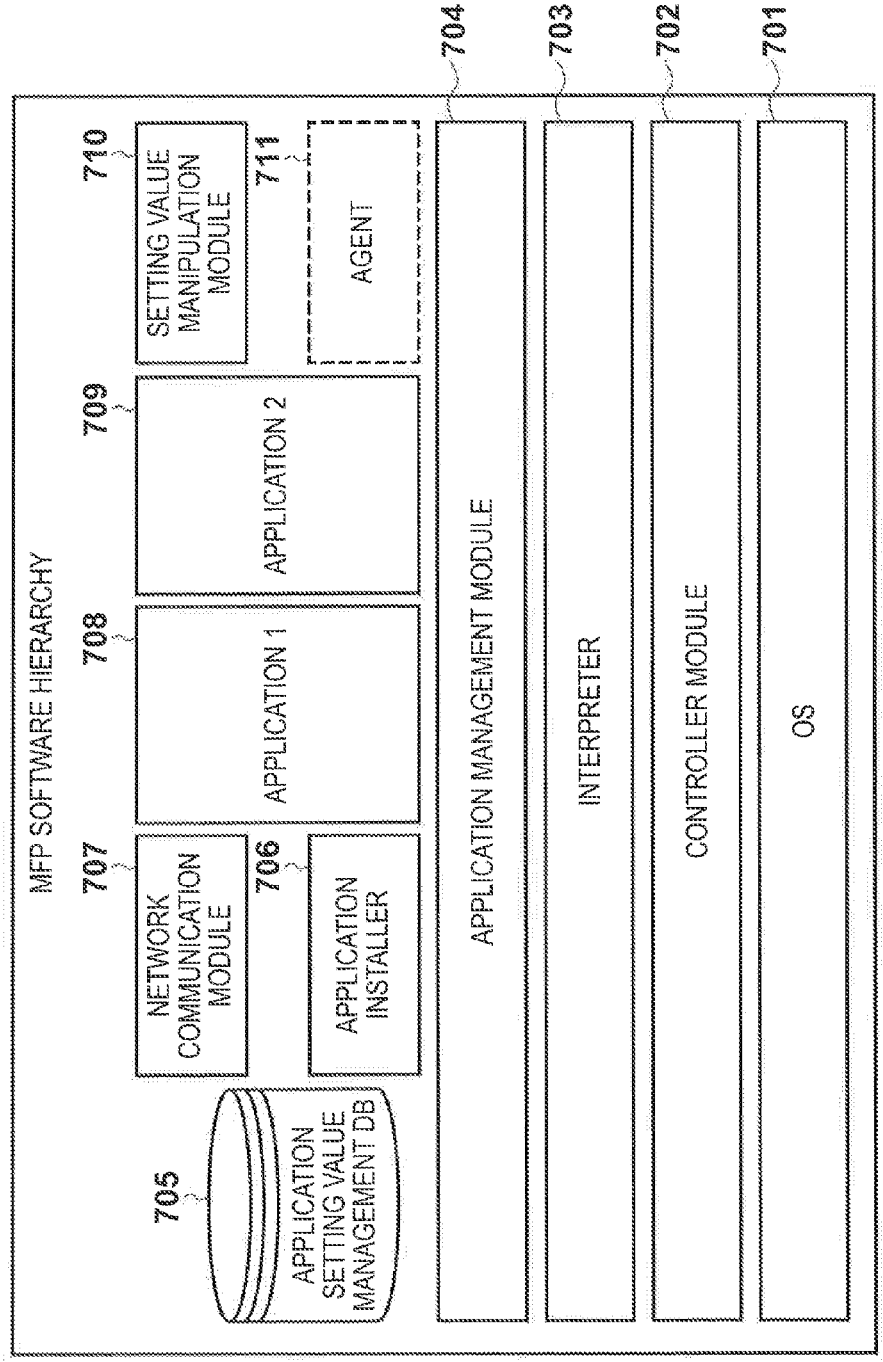
FIG. 7 is a hierarchy diagram of software modules in the MFP.

FIG. 7 is a view for explaining a software module hierarchy of the MFP. A software module has an operating system (OS) 701. The software module has a controller module 702 for various kinds of device control on the OS 701, and an interpreter 703 used to sequentially execute a program such as an application program on that module 702. The software module has an application management module 704 used to manage a plurality of applications, which can be dynamically removable, on the interpreter 703. Applications 708 and 709 which implement various functions run under the management of this application management module 704.

Application modules required to provide services of the MFP can run via the interpreter 703. For example, in response to installation of an application in the MFP by an application installer 706, the application management module 704 adds an application 708 or 709 as a management target. Furthermore, in response to deletion of an application program from the MFP, the application management module 704 can remove the application 708 or 709 from the management targets.

Also, the application installer 706 itself required to install or uninstall applications can run on the application management module 704.

The applications provide various kinds of processing to the user in cooperation with the MFP. For example, an application used to retouch and compress images, that used to make divisional control such as print restriction control, plug-in modules incorporated in an application, and the like can be taken as examples. Also, an application used to make remote management of the MFP, that used to control units such as a finisher of the MFP to attain bookbinding, and conversion/interpretation applications for specific document data are also examples. Furthermore, a document creation program like wordprocessing software, organizer program, spreadsheet program, database management program, server program required to implement print services via the Internet, and the like are also examples.

The application installer 706 acquires an application file from the management apparatus 101 via a network communication module 707. After that, the application installer 706 verifies whether or not a format and information of the application file are authentic, and then executes installation processing of the application. Furthermore, in order to prevent an installation instruction from an illicit user, the application installer 706 has a function of authenticating a user who accesses via the network communication module 707. The applications 708 and 709 can hold setting information required for themselves to run in an application setting value management DB 705.

When the application management module 704 launches the application 708 or 709, the application 708 or 709 reads out the own application setting information from the application setting value management DB 705 in a certain stage after the launch timing, and continues launch processing according to the readout application setting information. Since the application setting information is assigned with an application ID, the application can specify the corresponding application setting information with reference to that ID.

A setting value manipulation module 710 manipulates setting information of the application 708 or 709 in accordance with a setting value manipulation request from the management apparatus 101 received via the network communication module 707. After that, the setting value manipulation module 710 notifies the application 708 or 709 that the application setting values have been manipulated. The setting value manipulation module 710 can manipulate setting values of the application setting information with the standard format shown in FIG. 6. Note that MFPs which do not include any setting value manipulation module 710 are popularly used, and in such MFP, application setting information cannot be remotely manipulated unless an agent 711 (to be described later) is used. Even in an MFP including the setting value manipulation module 710, if an application itself is not compatible with remote manipulations of setting information, remote manipulations cannot be made. That is, when an MFP is incompatible with remote manipulations of setting information, that MFP (a given model of an MFP) does not include any setting value manipulation module 710. Also, when an application is incompatible with remote manipulations of setting information, setting information of that application does not have the standard format shown in FIG. 6.

When the application 708 or 709 is configured to respond to a notification from the setting value manipulation module 710, it can execute processing which is programmed to be executed after manipulations of setting values (for example, re-loading of application setting values) in response to the notification. Note that some models of MFPs do not include any setting value manipulation module 710.

The agent 711 is a program, which can be installed in or uninstalled from the MFP, and is required to manipulate application setting values of an application, which cannot communicate with the setting value manipulation module 710. The agent 711 is given with a setting value definition file provided by a vendor of such application, and has that file. This setting value definition file is registered in the application database 408 of the management apparatus as a part of the application list, so as to manipulate application setting information, which does not have the standard format shown in FIG. 6, and is provided to the agent from there. The operation of the agent 711 will be described in detail later in the flowchart shown in FIGS. 8A and 8B.

Prior to descriptions of the operations of the management apparatus, the application list, setting value definition file, and device list will be described below with reference to FIGS. 9, 10, and 11, respectively.

<Application List>

FIG. 9 shows an example of an application list 900 held in the application database 408. An application name 901 is a field used to store a name of an application registered in this list. An application ID 902 is a field used to store an ID of an application registered in this list. A version 903 is a field used to store a version of an application registered in this list. A setting value manipulation 904 is a field used to store information as to whether or not an application is compatible with a function, included in the MFP, of manipulating application setting values from a remote place. Note that a manipulation from a remote place (or a remote manipulation) indicates that on the initiative of an apparatus other than the MFP in which an application is installed, and is not always related to a physical distance. When an application communicates with only the setting value manipulation module 710 of the MFP, it is judged that the application is compatible with the remote manipulation function of its setting values. When an application communicates with both the setting value manipulation module 710 of the MFP and agent 711, it is judged that the application is partially compatible with the remote manipulation function. When an application communicates with only the agent 711, it is judged that the application is incompatible with the remote manipulation function. This judgment may be done in advance for each application, and may be saved as metadata of the application, or may be done by an administrator at the time of registration in the application list.

In this embodiment, as values of the setting value manipulation 904, "compatible", "partially compatible", and "incompatible" are stored, but values to be stored are not limited to them. Note that for an application whose value of the setting value manipulation 904 is "compatible" will be referred to as "standard application" hereinafter. Likewise, an application whose value of the setting value manipulation 904 is "partially compatible" will be referred to as "hybrid application" hereinafter. Also, an application whose value of the setting value manipulation 904 is "incompatible" will be referred to as "legacy application" hereinafter. Path information 905 is a field used to store a registration location of an application registered in this list. The "standard application" is synonymous with the aforementioned "standard application" which is compatible with the setting information of the standard format, although their definitions are different, and "compatible" described in the setting value manipulation 904 also means compatibility with the setting information of the standard format. As can be seen from the example of FIG. 9, registration locations of application names "App1" and "App2" are in the same apparatus, but a registration location of an application name "App3" is in an FTP server.

A setting value definition file 906 is a field used to store information of a file used when the management apparatus 101 manipulates application setting values of a hybrid or legacy application via the agent 711. The setting value definition file 906 is a file which describes items included in setting information, and can also be called a setting item definition file.

An application type 907 is a field used to store a type of an application registered in this list. In this embodiment, the application names "App1" and "App3" are classified as "general" applications, and the application name "App2" is classified as an "authentication" application. In this case, the "general" application is used to add. a new function to the MFP. Also, the "authentication" application is used to execute authentication processing required to use the MFP. Note that in this embodiment, "general" and "authentication" nave been exemplified as the types of applications. In addition, the types of applications may include "system" installed in advance in the MFP, so as to activate basic functions of the MFP.

<Setting Value Definition File>

FIG. 10 is a view for explaining the configuration of the setting value definition file 906. In FIG. 10, a setting value definition file 1000 is described using an XML format. Note that in this embodiment, since the communication protocols are HTTP and SOAP which is used on the HTTP, the setting value definition file 1000 is described using the XML format, but it may be described using other formats.

An application information description field 1001 bounded by an <AppInfo> tag is the same as the application information description field 601 in FIG. 6, and a description thereof will not be repeated. In FIG. 10, as an AppID attribute of the <AppInfo> tag of the application information description field 1001, a value "aaabb585-f319-4f24-b511-bbd9c8f690cc" is designated. As can also be seen from this field, the setting value definition file 1000 is prepared for each application.

Fields 1002 to 1004 bounded by <Data> tags include application setting value definitions. In a Name attribute of the <Data> tag, a name of the application setting value definition is designated. In this case, as the Name attributes of the <Data> tags of the application setting value definitions 1002, 1003, and 1004, "Font", "Font_color", and "Font_Size" are designated.

Since the setting value definition file has its principal purpose to define items of application setting values of an application, <Type> and <Value> tags included in the application setting values 602 to 604 in FIG. 6 are not necessary.

When the agent 711 receives an acquisition request of application setting information of, for example, a designated, non-standard application, it refers to a setting value definition file specified by an ID of that application. Then, the agent 711 searches setting information of that application for item names (for example, character strings) described as Name attributes of <Data> tags. Whole setting information of an application can be specified since it is associated with that application using, for example, an ID, and its data length is fixed. Then, the agent 711 reads data between character strings obtained by the search as a setting value of an item having the immediately preceding character string as an item name. The agent 711 repeats this processing for all items to add, for example, <Value> tags shown in FIG. 6 to the respective <Data> tags using the setting value definition file shown in FIG. 10 as a template, and to copy the readout setting values of the respective items as values of the <Value> tags. The agent 711 transmits the setting value information created in this way to the management apparatus. The same applies to a case in which each individual item is to be read out or changed, or all items are to be updated. Upon updating setting values, setting values for respective setting items are received from the management apparatus, and setting values of items found by a search are updated by the received setting values.

<Device List>

FIG. 11 shows an example of a device list 1100 including information of the MFP held in the device database 409. A serial number 1101 is a field used to store a serial number of an MFP. An IP address 1102 is a field used to store an IP address of an MFP. A product name 1103 is a field used to store a product name of an MFP. A setting value manipulation 1104 is a field used to store information as to whether or not an MFP has the remote manipulation function of setting values of an application. More specifically, when an MFP includes the setting value manipulation module 710, it is judged that the MFP has the remote manipulation function. In this embodiment, as values of the setting value manipulation 1104, "possible" and "impossible" are stored. However, the present invention is not limited to them. Also, this judgment need not be executed at the time of creation of the device list. That is, "possible" or "impossible" is registered in advance in the management apparatus for each product name (that is, model) of an MFP, and a value corresponding to the registered product name of the MFP is registered as the setting value manipulation 1104.

An installed application 1105 is a field used to enumerate application programs installed in an MFP. Note that the device list 1100 may include, for example, information of a nickname, location, and the like of an MFP in addition to pieces of detailed information in the items 1101 to 1105.

<Manipulation Sequence of Setting Value by Management Apparatus>

Figure 8A:
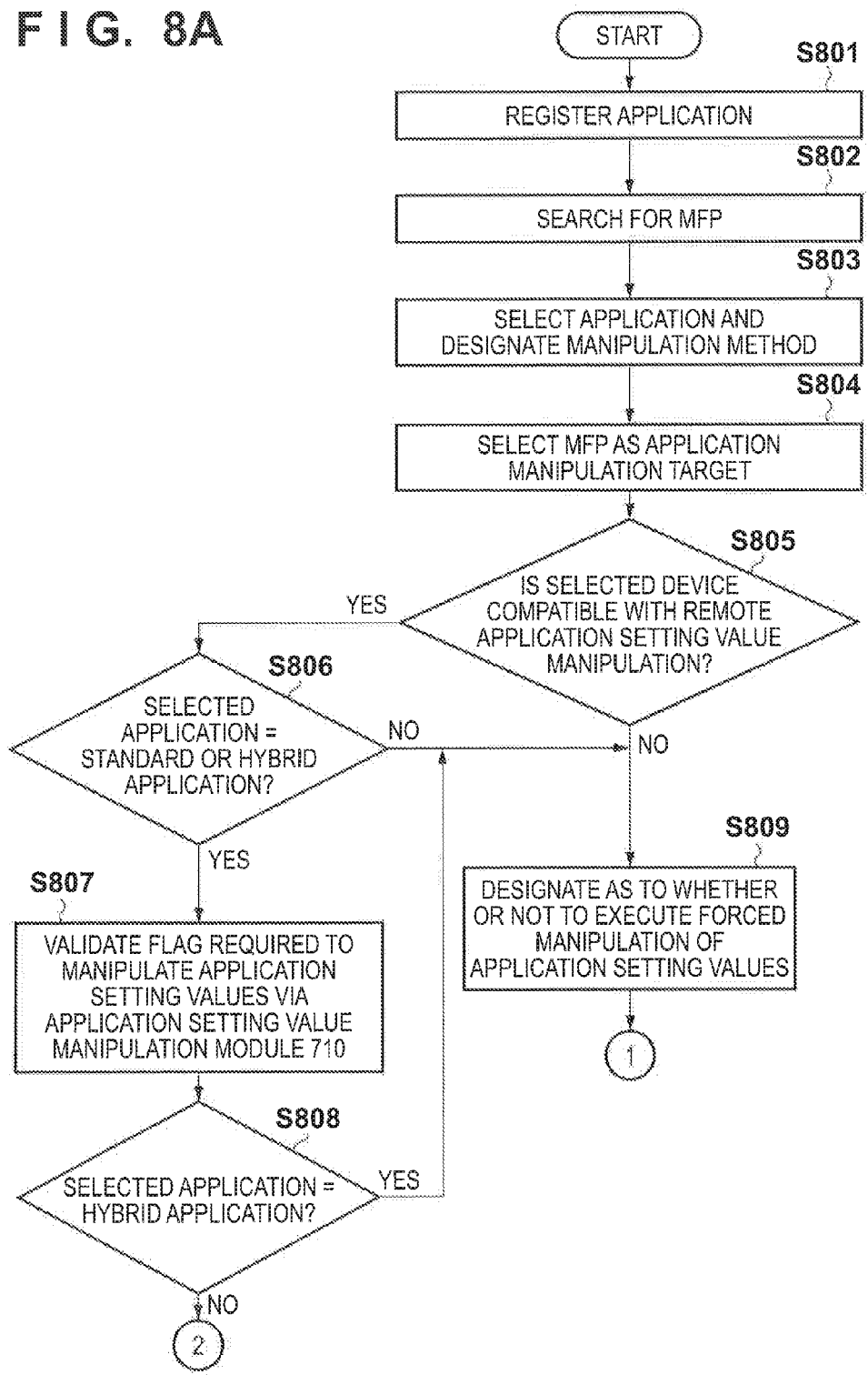

In order to manipulate setting values of at least one application installed in at least one network device, the CPU of the management apparatus 101 executes a program whose sequence (steps) is shown in the flowchart of FIGS. 8A and 8B.

For example, selection processing of a menu from a UI by the user is detected by the UI control module 401, and the UI control module 401 launches the application management module 402, thereby starting this flowchart.

Referring to FIGS. 8A and 8B, in step S801, the application management module 402 accepts an application addition request from the user via the UI control module 401, and stores a requested application program or data in the application list of the application database 408. An application to be added is supplied from, for example, a recording medium or communication medium.

The agent 711 is also added to the application list in this step. Also, a "setting value definition file" required for the management apparatus to manipulate application setting values using the agent 711 is added to the application list in this step.

Note that the application addition request may include entities of the application to be added and the setting value definition file, or may include only path information to the entities of the application and setting value definition file, which are allocated in, for example, an external FTP server. The example of the application list is as shown in FIG. 9, and that of the setting value definition file included in that list is as shown in FIG. 10.

In step S802, the device management module 403 searches for an MFP connected to the network via the search module 406. Furthermore, the device management module 403 acquires detailed information of the discovered MFP via the communication module 407, and stores the acquired information in the device list of the device database 409. The example of the device list is as shown in FIG. 11.

In step S803, the UI control module 401 displays an application selection screen, accepts an input from the user from the screen, and passes the input result to the application management module 402 and setting value management module 405. The application management module 402 specifies an application selected by the user from the input result, and reads out information of that application from the application database 408. The application management module 402 temporarily stores the readout information in the RAM 203 or HDD 212. The setting value management module 405 stores information of an input manipulation method in the RAM 203 or HDD 212. FIG. 12 shows an operation screen used to select an application, and that screen will be described later.

When the user selects a check box in step S803, the UI control module 401 passes the application selection information to the application management module 402. A selected application will be referred to as a target application hereinafter. When the user selects a radio button the UI control module 401 passes manipulation method information of the application to the setting value management module 405.

In step S804, the UI control module 401 accepts an input from the user from an MFP selection screen, and passes the input result to the device management module 403. The device management module 403 specifies an MFP selected by the user from the passed input result, and reads out information of that MFP from the device database 409. The device management module 403 temporarily stores the readout information in the RAM 203 or HDD 212. The setting value management module 405 temporarily stores authentication information input in a field 1306 in FIG. 13 in the RAM 203 or HDD 212. FIG. 13 shows the MFP selection screen, which will be described later. A selected network device will be referred to as a target network device hereinafter.

When the user selects a check box in step S804, the UI control module 401 passes selection information of the MFP to the device management module 403.

The setting value management module 405 judges in step S805 whether or not the MFP selected in step S804 has the remote manipulation function of setting values of an application. More specifically, in this judgment step, the setting value management module 405 checks a value in the application setting value manipulation 1104 in the device list 1100. If the setting value management module 405 judges that the MFP selected in step S804 has the remote manipulation function, the process advances to step S806; otherwise, the process advances to step S809.

The setting value management module 405 discriminates in step S806 whether or not the application selected in step S803 is a standard or hybrid application. That is, the setting value management module 405 determines whether or not the application is compatible with standard setting information shown in, for example, FIG. 6. More specifically, in this judgment step, the setting value management module 405 checks a value of the setting value manipulation 904 in the application list 900.

In this embodiment, when the value of the setting value manipulation 904 is "compatible", it is judged that one application is a standard application. When the value of the setting value manipulation 904 is "partially compatible", it is judged that the application is a hybrid application. If the setting value management module 405 judges that the application is a standard or hybrid application, the process advances to step S807; otherwise, the process advances to step S809.

In step S807, a flag required for the setting value management module 405 to transmit a manipulation request of application setting values in step S819 (to be described later) is validated.

The setting value management module 405 discriminates in step S808 whether or not the application selected in step S803 is a hybrid application. More specifically, in this judgment step, the setting value management module 405 checks a value of the setting value manipulation 904 in the application list 900. In this embodiment, when the value of the setting value manipulation 904 is "partially compatible", it is discriminated that the application is a hybrid application. If the setting value management module 405 judges that the application is a hybrid application, the process advances to step S809; otherwise, the process advances to step S818.

Steps S809 to S817 are executed when application setting values are to be manipulated using an agent installed in the MFP as a manipulation target. As for a hybrid application, some applications which are not compatible with remote manipulations are targeted. When an arbitrary manipulation request is sent to the MFP as the manipulation target which executes authentication management, the setting value management module 405 has to execute, in advance, authentication using the authentication information input in the field 1306 in FIG. 13 by the user.

Figure 14:
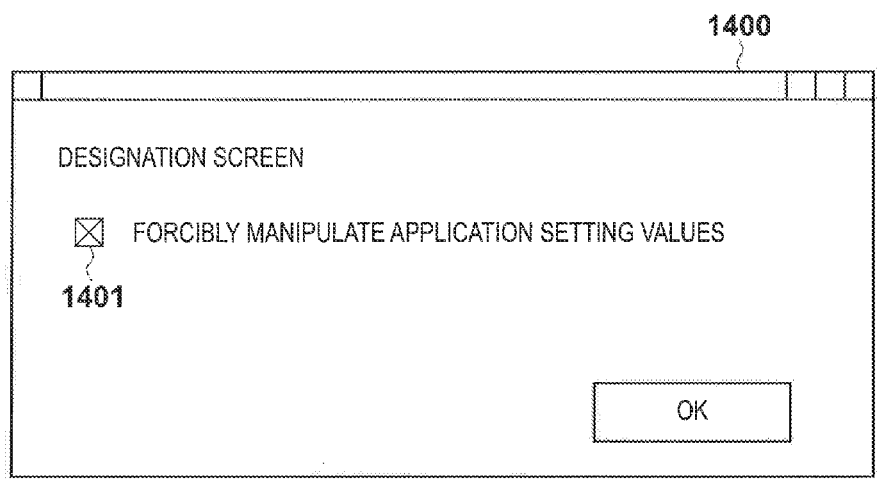
FIG. 14 is a view showing an example of a designation screen associated with a setting value forced manipulation of an application.

In step S809, the UI control module 401 accepts a selection input of the user from a designation screen associated with forced manipulations of setting values of an application, and passes the input result to the setting value management module 405. The setting value management module 405 specifies from that input result whether or not the user designates "to make forced manipulation" as a manipulation method of application setting values, and stores a result in the RAM 203 or HDD 212. In this embodiment, "to make forced manipulation" means that application setting value manipulations are executed irrespective of a status of the manipulation target application. That is, even when the application is running, the setting value manipulations are executed without quitting the application. For example, it is difficult to quit an application which collects operation logs of an MFP even temporarily. In such case, forced manipulations are required. FIG. 14 shows an example of the designation screen used to designate whether or not to execute forced manipulations, and that screen will be described later.

The device management module 403 discriminates in step S810 whether or not the agent 711 is installed in the MFP selected in step S804. More specifically, the device management module 403 confirms values of the installed application 1105 in the device list 1100. For example, if the installed application 1105 includes a value "agent" in a field corresponding to the MFP selected in step S804, it is determined that the agent 711 is installed in that MFP. The operations of the agent 711 will be described in detail later in steps S815 and S817. If the device management module 403 judges that the agent 711 is installed, the process advances to step S814; otherwise, the process advances to step S811 to attempt to install the agent.

The device management module 403 discriminates in step S811 whether or not the agent 711 can be installed in the MFP selected in step S804. For example, if the agent 711 is not registered, in the application list 900, it cannot be installed. In this case, a preparation for installing the agent 711 by the installation processing module 404 is completed by adding the agent 711 to the application list 900 in step S801. For example, the manifest file 501 of the agent 711 often describes models of MFPs in which the agent 711 can be installed. If the MFP selected in step S804 does not match one of these models, the installation processing module 404 cannot install the agent 711. If the device management module 408 discriminates that the agent 711 can be installed, the process advances to step S812; otherwise, this flowchart ends.

In step S812, the installation processing module 404 issues an installation request of the agent 711 to the MFP selected in step S804. The MFP selected in step S804 receives the installation request in step S812 and an application file of the agent 711. After that, the application installer 706 executes installation processing of the agent 711, and returns that result to the management apparatus 101.

In step S813, the installation processing module 404 receives the installation processing result returned from the application installer 706 of the MFP in step S812. After that, the installation processing module 404 discriminates whether or not installation of the agent 711 has succeeded. If the installation processing module 404 discriminates that installation of the agent 711 has succeeded, the process advances to step S814; otherwise, this flowchart ends.

The setting value management module 405 discriminates in step S814 whether or not the manipulation method of the hybrid or legacy application selected in step S803 is "all deletion". If the setting value management module 405 discriminates that the manipulation method is "all deletion", the process advances to step S815; otherwise, the process advances to step S816.

In step S815, the setting value management module 405 executes "all-deletion" processing of application setting values of the hybrid or legacy application selected in step S803 for the MFP selected in step S804. More specifically, the setting value management module 405 communicates with the agent 711 via the network communication module 707 of the MFP to execute "all-deletion" processing of application setting values of the hybrid or legacy application as the manipulation target via the agent. Details of the processing in step S815 will be described later with reference to FIG. 15. This description will be given after that of FIGS. 8A and 8B. Note that step S815 is often executed for a standard application target. For example, when an MFP of interest (that is, a network device of interest) does not include any setting value manipulation module 710, even when a manipulation target application is a standard application, all setting information of that standard application is deleted via the agent by performing the all-deletion processing.

The setting value management module 405 discriminates in step S816 whether or not a setting value definition file of the hybrid or legacy application selected in step S803 is registered in the management apparatus 101. More specifically, the setting value management module 405 reads a value of the setting value definition file 906 in the application list 900, and determines the presence/absence of the setting value definition file. If the setting value definition file 905 stores information in a field corresponding to that application, the setting value definition file of that application is registered in the management apparatus 101. If the setting value management module 405 discriminates that the setting value definition file of the hybrid or legacy application is registered in the management apparatus 101, the process advances to step S817; otherwise, this flowchart ends.

In step S817, the setting value management module 405 manipulates application setting values of the hybrid or legacy application selected in step S803 by the manipulation method designated in step S803 for the MFP selected in step S804. More specifically, the setting value management module 405 communicates with the agent 711 via the network communication module 707 of the MFP to manipulate application setting values of the hybrid or legacy application as the manipulation target via the agent. Manipulations to be executed in this step are those other than "all deletion". Details of the processing in step S817 will be described later with reference to FIG. 16. This description will be given after that of FIGS. 8A and 8B.

Note that step S817 is often executed for a standard application as a target. For example, when an MFP of interest (that is, a network device of interest) does not include any setting value manipulation module 710, even when the manipulation target application is a standard application, setting information of that standard application is manipulated via the agent. In this case, a setting value definition file corresponding to the standard format is prepared. This file can be prepared in advance in the management apparatus since it corresponds to the standard format, and does not depend on vendors of applications.

It is discriminated in step S818 whether or not the flag indicating that the manipulation target application is a standard or hybrid application is validated in step S807. If it is discriminated that the flag is validated, the process advances to step S819; otherwise, the process advances to step S820. That is, if the manipulation target is a legacy application, step S819 is skipped; if it is a standard or hybrid application, the process advances to step S819.

In step S819, the setting value management module 405 transmits a request to manipulate application setting values of the standard or hybrid application selected in step S803 by the manipulation method designated in step S803 to the MFP selected in step S804. When an arbitrary manipulation request is issued to the manipulation target MFP which performs authentication management, the setting value management module 405 has to execute, in advance, authentication using the authentication information input in the field 1306 of FIG. 13 by the user. Also, the setting value manipulation module 710 which received the request via the network communication module 707 executes the requested manipulations.

For example, when application setting values are to be delivered, the setting value management module 405 sends the application setting information exemplified in FIG. 6 to the setting value manipulation module 710 of the MFP. Note that the application setting information is held in the application database 408. The setting value manipulation module 710 writes the received application setting information in the corresponding application setting information.

When application setting values are to be acquired, the setting value management module 405 sends an acquisition result of application setting information to the setting value manipulation module 710 of the MFP. In response to this request, the setting value manipulation module 710 of the MFP loads application setting information of a target application, and returns it to the management apparatus. This application setting information is registered in the application database 408 in the management apparatus in association with identification information required to specify the MFP and application identification information.

When the deletion or all-deletion processing is applied to application setting values, the setting value management module 405 sends a deletion request of application setting information to the setting value manipulation module 710 of the MFP. In response to this request, the setting value manipulation module 710 of the MFP deletes setting information in the application setting value management DB 705. In this case, for example, when a corresponding application determines that application setting information is not available upon activation, it re-sets initial values of setting information, which has been installed together with the application program, in the application setting information. Of course, operations after deletion other than the above operation may be executed.

When the setting information in the application setting value management DB 705 has changed, the setting value manipulation module 710 notifies the standard or hybrid application, which is influenced by that change of manipulations of application setting values.

Upon reception of the notification, the standard or hybrid application loads application setting values from the application setting value management DB 705 via the application management module 704 as needed.

In step S820, the setting value management module 405 executes post-processing of manipulations of the application setting information executed in step S815, S817, or S819.

When the manipulation contents correspond to delivery of application setting information, the setting value management module 405 receives a delivery result of the application setting information from the MFP via the communication module 407. The received result is stored in the RAM 203 or HDD 212.

When the manipulation contents correspond to acquisition of application setting information, the setting value management module 405 receives an acquisition result of the application setting information from the MFP via the communication module 407. If the acquisition result indicates a success, the setting value management module 405 also receives the application setting information at the same time. The received result is stored in the RAM 203 or HDD 212. The received application setting information is stored in the application database 408.

When the manipulation is deletion or all-deletion of application setting information, the setting value management module 405 receives a deletion/all-deletion result of the application setting information from the MFP via the communication module 407. The received result is stored in the RAM 203 or HDD 212.

In case of any of manipulations such as delivery, acquisition, and deletion/all-deletion of setting information, the UI control module 401 can present the received result stored in the RAM 203 or HDD 212 to the user as needed.

The flowchart shown in FIGS. 8A and 8B have been described.

<Details of Step S815>

Figure 15:
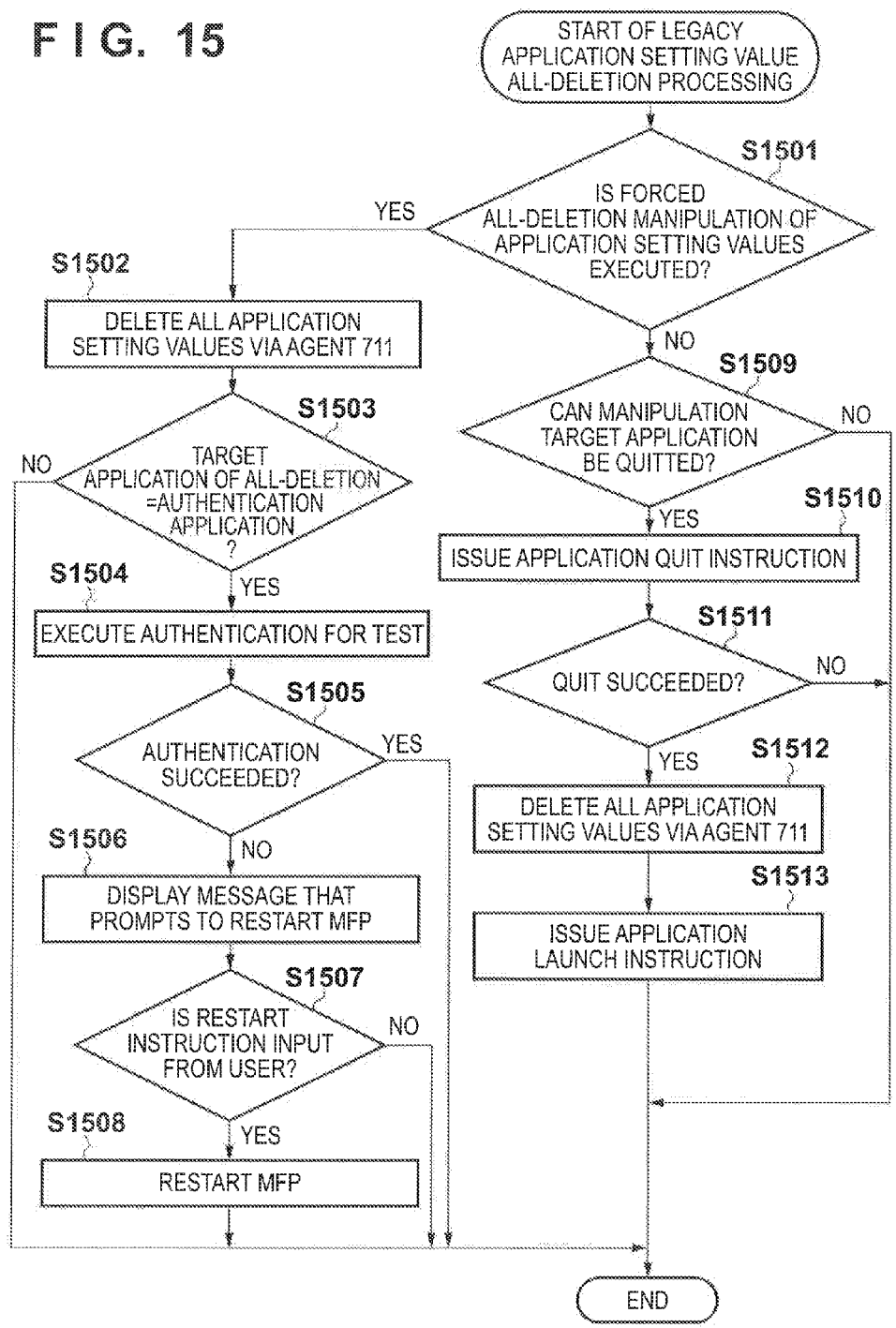
FIG. 15 is a flowchart of all legacy application setting values deletion processing according to the first embodiment.

FIG. 15 is a flowchart for explaining the processing in step S815 in detail. Referring to FIG. 15, in step S1501, the setting value management module 405 reads out the input result in step S809 from the RAM 203 or HDD 212. After that, the setting value management module 405 discriminates based on the readout input result whether or not the forced manipulations of application setting value are to be executed. If the setting value management module 405 judges that the forced manipulations of application setting values are to be executed, the process advances to step S1502; otherwise, the process advances to step S1509.

In step S1502, the setting value management module 405 transmits a request to delete all application setting values of the hybrid or legacy application selected in step S803 to the agent 711 in the MFP selected in step S804. The agent 711, which received the request via the network communication module 707, executes the requested all-deletion manipulations. Note that step S1502 is executed while the hybrid or legacy application as the manipulation target is running unlike in steps S1503 to S1507.

The setting value management module 405 discriminates in step S1503 whether or not the hybrid or legacy application which has undergone the all-deletion processing in step S1502 is an authentication application. More specifically, the setting value management module 405 discriminates whether or not a value of the application type 907 of that application is "authentication". If that application is an authentication application, the process advances to step S1504; otherwise, this flowchart ends.

In step S1504, the setting value management module 405 executes authentication processing again using the authentication information input in the field 1306 in FIG. 13 by the user. Whether or not the authentication function of the MFP is invalidated, as a result of all-deletion of application setting values in step S1502 can be verified by executing this step.

The setting value management module 405 discriminates in step S1505 whether or not the authentication has succeeded as a result of the authentication processing executed in step S1504. If the authentication has succeeded, it can be determined that the authentication function of the authentication application is valid. If the authentication has succeeded, this flowchart ends; otherwise, the process advances to step S1506.

In step S1506, the UI control module 401 displays a message which prompts the user to restart the MFP on the network device management software 400. If the network device management software 400 has a function of restarting the MFP, a restart button of the MFP may be displayed together with the message in step S1506. In this case, following steps S1507 and S1508 are executed.

It is judged in step S1507 whether or not the user presses the restart button. If the user presses the button to issue a restart instruction of the MFP, the process advances to step S1508; otherwise, this flowchart ends.

In step S1506, the device management module 403 issues a restart request of the MFP. The MFP, which received the restart request, restarts itself.

The application management module 402 determines in step S1509 whether or not the hybrid or legacy application selected in step S803 can be quitted. If the application management module 402 can quit that application, the process advances to step S1510; otherwise, this flowchart ends.

In step S1510, the installation processing module 404 transmits a request to quit the application, for which it is determined in step S1509 that the application can be quitted, to the MFP selected in step S804. The application installer 706, which received the request via the network communication module 707, executes the requested manipulation.

In step S1511, the application management module 402 receives the processing result in step S1510 from the MFP via the communication module 407, and discriminates whether or not the quit processing has succeeded. If the application management module 402 judges that the application quit processing has succeeded, the process advances to step S1512; otherwise, this flowchart ends.

Step S1512 is the same as step S1502, and a description thereof will not be repeated. However, in this step, since the hybrid or legacy application as the manipulation target is quitted, the setting value management module 405 can manipulate application setting values more safely.

In step S1513, the installation processing module 404 issues a launch request of the application quitted in step S1510. The application installer 706, which received the request via the network communication module 707, executes the requested manipulation. The flowchart shown in FIG. 15 has been described.

<Details of Step S817>

FIG. 16 is a flowchart for explaining the processing in step S817 in detail. In FIG. 16, step S1601 is the same as step S1501 in FIG. 15, and a description thereof will not be repeated.

In step S1602, the setting value management module 405 transmits a request to manipulate application setting values of the hybrid or legacy application selected in step S803 to the agent 711 of the MFP selected in step S804. The setting value management module 405 transmits the request while appending a setting value definition file registered in the setting value definition file 906 in association with the manipulation target application. The agent 711, which received the request via the network communication module 707, executes the requested manipulation according to the contents described in the setting value definition file 906. Note that step S1602 is executed while the hybrid or legacy application as the manipulation target is running unlike in steps S1603 to S1607.

Since steps S1603 to S1605 are the same as steps S1509 to S1511 in FIG. 15, a description thereof will not be repeated.

Since step S1606 is the same as step S1602, a description thereof will not be repeated. However, in this step, since the hybrid or legacy application as the manipulation target is quitted, the setting value management module 405 can manipulate application setting values more safely.

Since step S1607 is the same step S1513 in FIG. 15, a description thereof will not be repeated.

<Example of Application Selection Screen>

FIG. 12 shows am example of an application selection screen 1200. An application name 1201 displays values of the application name 901 in FIG. 9. Check boxes selectable by the user are laid out before application names such as "App1". An application ID 1202 displays values of the application ID 902 in FIG. 9. A version 1203 displays values of the version 903 in FIG. 9. A setting value manipulation 1204 displays values of the setting value manipulation 904 in FIG. 9. Path information 1205 displays values of the path information 905 in FIG. 9. A setting value definition file 1206 displays values of the setting value definition file 906 in FIG. 9. When information of a setting value definition file is not stored, "-" (in case of a standard application) or "none" (in case of a hybrid or legacy application) is displayed in this embodiment. However, the present invention is not limited to this. An application type 1207 displays values of the application type 907 in FIG. 9. Note that when the application list 900 stores information other than the pieces of application information 901 to 907, that information may be displayed on the application selection screen 1200 as needed. A manipulation method designation radio button 1208 is used to designate how the setting value management module 405 manipulates the application selected in step S803. In FIG. 12, four manipulation methods, that is, "acquisition", "delivery", "deletion", and "all deletion" are enumerated.

<Example of MFP Selection Screen>

FIG. 13 shows an example of an MFP selection screen 1300. A serial number 1301 displays values of the serial number 1101 in FIG. 11. Check boxes selectable by the user are laid out before serial numbers such as "ABC123". An IP address 1302 displays values of the IP address 1102 in FIG. 11. A product name 1303 displays values of the product name 1103 in FIG. 11. A setting value manipulation 1304 displays values of the setting value manipulation 1104 in FIG. 11. An installed application 1305 displays values of the installed application 1105 in FIG. 11. In authentication information 1306, the user inputs authentication information required when the MFP executes manipulations assumed in this embodiment. Note that when the device list 1100 stores information other than the pieces of detailed, information 1101 to 1105, that information may be displayed on the MFP selection screen 1300 as needed.

<Example of Designation Screen Associated with Forced Manipulation of Setting Value>

FIG. 14 shows an example of a designation screen 1400 associated with forced manipulations of setting values of an application. A forced manipulation method designation check box 1401 is used to select whether or not forced manipulations are to be executed when the setting value management module 405 manipulates application setting values of the hybrid or legacy application.

Note that in FIG. 14, a manipulation method of all of the MFP, application, manipulation contents, and the like is designated. Alternatively, check boxes may be prepared in correspondence with MFPs, applications, and manipulation contents.

With the aforementioned configurations and sequences, application setting information can be remotely manipulated independently of whether or not a network device is compatible with remote manipulations of application setting information or whether or not an application installed in a network device is compatible with remote manipulations of application setting information.

When the user selects an application and a network device, and designates manipulations to be executed, the designated manipulations can be executed for the selected application and network device as targets. For example, when a plurality of selected devices include an MFP which is compatible with a standard application and that which is incompatible with a standard application, the designated manipulations can be executed for both of these MFPs. The same applies to applications. That is, even when a plurality of selected applications include a standard application and non-standard application, the designated manipulations can be executed for both of these applications. However, in this case, it is desirable to designate manipulations for each application, but read-out manipulations of all items may be designated for all of the designated applications together.

[Other Embodiments]

In this embodiment, when it is determined with reference to the device list, that is, the device list and application list that both of a device and application are compatible with remote manipulations of setting information, the application setting value manipulation module is used. Otherwise, the agent is installed as needed, and is used together wish a setting value definition file. Therefore, for example, by focusing attention on only the device list, if the designated MFP is not compatible with setting information of the standard format, whether or not the agent is installed in that device (that is, the presence/absence of the agent) may be determined. When the agent is not installed, it may be installed. This is because as described above in step S815, such device has to use the agent independently of a standard or legacy application. With this configuration, setting information of an application installed in an MFP which is not compatible with setting information of the standard format can be remotely manipulated.

In the sequence shown in FIGS. 8A and 8B, the case has been explained wherein setting information of one application as a target installed in one MFP is to be remotely manipulated. However, as shown in the examples of the user interfaces, a plurality of MFPs and a plurality of applications can be designated as targets. In this case, the sequence shown in FIGS. 8A and 8B is repeated for all the designated MFPs and applications. More specifically, after step S820 in FIG. 8B and immediately before END (after branches are merged), whether or not manipulations of all the designated applications are complete in a device of interest (an MFP as the current processing target) is checked. If the manipulations are not complete yet, a new application of interest is selected as a manipulation target, and the process returns to step S805. Of course, identification information indicating a device of interest and application of interest is stored in, for example, a memory. On the other hand, if the manipulations are complete, whether or not manipulations of setting information are complete for all the designated MFPs is checked. If the manipulations are not complete yet, the next MFP of interest of the designated MFPs is selected as a manipulation target, an application of interest is returned to the first one of the designated applications, and the process returns to step S805. On the other hand, if the manipulations are complete, the sequence shown in FIG. 8B ends.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-030221, filed Feb. 15, 2011 and 2011-125713, filed Jun. 3, 2011, which are hereby incorporated by reference herein in their entirety.

What is claimed is:

1. A management apparatus for a network device, comprising:
a storage unit configured to store, in a storage medium, a device list which registers a model of a network device and information indicating whether or not the model is compatible with standard setting information defined in a predetermined format in association with each other; and
a request unit configured to transmit, when it is determined with reference to the device list that a target network device is not a model compatible with the standard setting information, a request to execute a manipulation of setting information of an application as a manipulation target via an agent required to manipulate the setting information of the target application which runs on the target network device,
wherein the request unit further comprises an installation unit configured to control the target network device to install the agent is not installed in the target network device to which the request is transmitted, and
wherein the agent to be installed to the target network device is given with a definition file corresponding to the target application, the definition file defining items included in setting information which is not defined in the predetermined format.

2. The apparatus according to claim 1, wherein the storage unit further stores an application list in which a type of an application and information indicating whether or not the application is compatible with the standard setting information are registered in association with each other, and
wherein the request unit refers to the device list and the application list, and
(i) when the target network device is a model compatible with the standard setting information, and an application as the manipulation target is not compatible with the standard setting information, the request unit transmits a request to execute a manipulation of the setting information of the application as the manipulation target via the agent, and
(ii) when the target network device is a model compatible with the standard setting information, and an application as the manipulation target is compatible with the standard setting information, the request unit transmits a request to execute the manipulation of the setting information of the application as the manipulation target without intervention of the agent.

3. The apparatus according to claim 1, wherein the storage unit further stores a definition file which defines items included in setting information which is not defined in the predetermined format, and
wherein when the request unit transmits the request to execute the manipulation of the setting information of the application as the manipulation target via the agent, the request unit transmits a definition file corresponding to the application as the manipulation target to the agent.

4. The apparatus according to claim 1, wherein the manipulation to be executed in response to the request includes at least one of a read-out manipulation of the setting information and a change manipulation of the setting information.

5. The apparatus according to claim 1, wherein when the request unit transmits the request to execute the manipulation of the setting information of the application as the manipulation target via the agent, the manipulation of the setting information via the agent is executed independently of an operation status of the application as the manipulation target.

6. The apparatus according to claim 1, wherein when the request unit transmits the request to execute the manipulation of the setting information of the application as the manipulation target via the agent, the application as the manipulation target is temporarily quitted, and the manipulation of the setting information via the agent is executed.

7. A management method in a management apparatus for a network device, comprising:
   storing, in a storage medium, a device list which registers a model of a network device and information indicating whether or not the model is compatible with standard setting information defined in a predetermined format in association with each other; and
   transmitting, when it is determined with reference to the device list that a target network device is not a model compatible with the standard setting information, a request to execute a manipulation of setting information of an application as a manipulation target via an agent required to manipulate the setting information of the target application which runs on the target network device,
   wherein transmitting the request includes controlling the target network device to install the agent when the agent is not installed in the target network device to which the request is transmitted, and
   wherein the agent to be installed to the target network device is given with a definition file corresponding to the target application, the definition file defining items included in setting information which is not defined in the predetermined format.

8. A management system in which a management apparatus manages a network device on which an application runs, the management apparatus comprising:
   a storage unit configured to store, in a storage medium, a device list which registers a model of a network device and information indicating whether or not the model is compatible with standard setting information defined in a predetermined format in association with each other; and
   a transmission unit configured to transmit, when it is determined with reference to the device list that a target network device is not a model compatible with the standard setting information, a request to execute a manipulation of setting information of an application as a manipulation target via an agent required to manipulate the setting information of the target application which runs on the target network device,
   wherein the transmission unit further comprises an installation unit configured to control the target network device to install the agent when the agent is not installed in the target network device to which the request is transmitted, and
   wherein the agent to be installed to the target network device is given with a definition file corresponding to the target application, the definition file defining items included in setting information which is not defined in the predetermined format, and the network device comprising:
   a control unit configured to execute the agent; and
   a reception unit configured to receive a request to execute a manipulation of setting information of an application which runs on the network device from the management apparatus,
   wherein as a function of the agent, the agent manipulates the setting information in response to the request.

9. A management method in a management system in which a management apparatus manages a network device on which an application runs,
   wherein the management apparatus executes:
       storing, in a storage medium, a device list which registers a model of a network device and information indicating whether or not the model is compatible with standard setting information defined in a predetermined format in association with each other; and
       transmitting, when it is determined with reference to the device list that a target network device is not a model compatible with the standard setting information, a request to execute a manipulation of setting information of an application as a manipulation target via an agent required to manipulate the setting information of the target application which runs on the target network device,
   wherein transmitting the request includes controlling the target network device to install the agent when the agent is not installed in the target network device to which the request is transmitted, and
   wherein the agent to be installed to the target network device is given with a definition file corresponding to the target application, the definition file defining items included in setting information which is not defined in the predetermined format, and wherein the network device executes:
       executing the agent; and
       receiving a request to execute a manipulation of setting information of an application which runs on the network device from the management apparatus,
       wherein as a function of the agent, the agent manipulates the setting information in response to the request.

10. A non-transitory computer-readable medium in which a program for controlling a computer as a management apparatus according to claim 1 is encoded.

* * * * *